June 24, 1958     L. E. CALDWELL ET AL     2,839,943
MOLDED ARTICLE OF MANUFACTURE AND METHOD OF MAKING THE SAME
Filed May 28, 1954
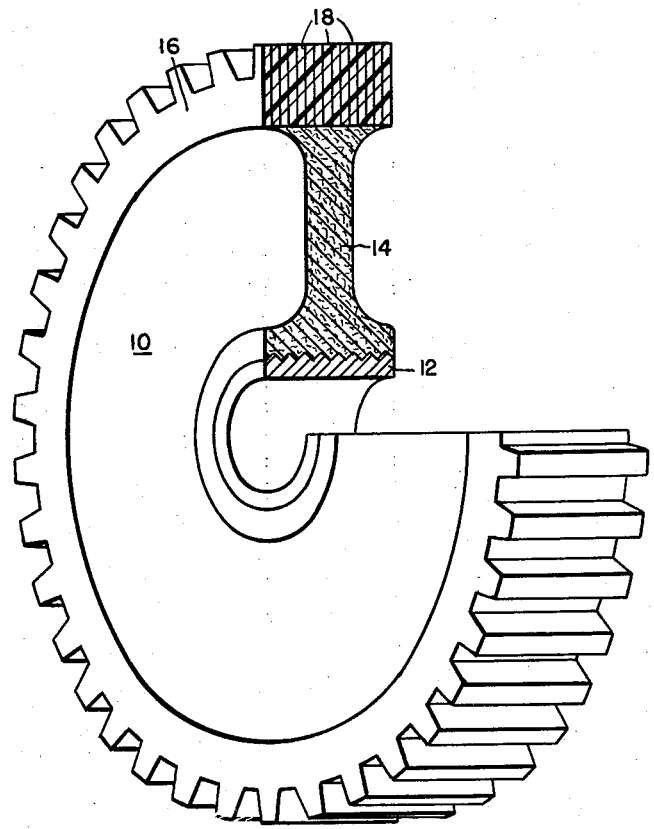
WITNESSES:
E. A. McCloskey.
Wescott B. Rorham
INVENTOR
Lewis E. Caldwell.
BY
ATTORNEY

United States Patent Office 2,839,943
Patented June 24, 1958

2,839,943

MOLDED ARTICLE OF MANUFACTURE AND METHOD OF MAKING THE SAME

Lewis E. Caldwell, Greensburg, Pa., and Ernest O. Hausmann, Red Bank, N. J.; said Caldwell, assignor to Westinghouse Electric Corporation, East Pittsburgh, Pa., a corporation of Pennsylvania, and said Hausmann, assignor to Continental-Diamond Fibre Division of The Budd Company, Inc., Newark, Del., a corporation of Delaware Application May 28, 1954, Serial No. 432,976

3 Claims. (Cl. 74—445)

This invention relates to molded articles of manufacture, such as gear wheels, and a method of making the same.

It is common practice in the internal combustion engine field to employ certain gears and pinions molded from a composition comprising a cotton fibrous material and a thermosetting resin. Molded gears of this type are used extensively for timing or camshaft gears which mesh with a metal crank shaft pinion gear in the engine assembly. A primary advantage derived by using a molded gear in such an application is quietness of operation. A molded gear mated with a metal pinion produces much less gear noise than two mating metal gears operating under the same conditions.

With the recent development of more powerful automobile engines operating at higher speeds and having higher engine operating temperatures, there has been an increase in the physical properties required of a satisfactory molded gear. This is particularly true for load strength and wear resistance. The type of molded resinous gear which gave good service some five years ago is no longer considered satisfactory in view of its marked reduction in life when subjected to the stresses incurred with service in the present day faster and more powerful engines.

An object of this invention is to provide a molded gear having high strength and wear resistance at elevated temperatures by utilizing a novel molding composition comprising a thermosettable resinous binder and a purified cotton filler.

A further object of this invention is to provide a method of molding an article of manufacture from a molding composition comprising a thermosettable resinous binder and a purified cotton filler.

Other objects of the invention will, in part, be obvious and will, in part, appear hereinafter.

For a fuller understanding of the nature and objects of the invention, reference should be had to the following detailed description and drawing, in which the single figure is a perspective view of a camshaft gear, partly in section, produced in accordance with this invention.

We have discovered that gears molded from a specially prepared cotton fibrous material filler and a thermosetting resinous binder can be produced having greatly increased strength and wear resistance properties at elevated temperatures over previously known molded gears. This is accomplished by using a purified cotton filler which is substantially pure cellulose.

In the past, it was customary to use cotton fibrous material known as "grey goods" for the filler in making molded resinous gears. These "grey goods" contained a certain amount of dirt, starch sizing, natural oils and waxes. In practicing our invention, it is necessary to remove these impurities to produce a cotton filler which is substantially pure cellulose. This may be accomplished by treating the cotton "grey goods" with enzymes to convert the starch sizing to sugar. The material is then washed in a caustic solution to remove the sugar, natural oils, waxes, and other impurities. After this treatment, the material is washed with water to remove all traces of the caustic whereby substantially pure cellulose remains. The purification to substantially pure cellulose results in approximately a 15% by weight reduction from the original cotton material or "grey goods."

Any suitable thermosetting resin may be used as a binder in practicing this invention, so long as the curing temperature of the resin is not so high that the purified cotton filler would be decomposed. Resins which have given good results are phenol-formaldehyde condensation products, epoxy resins, melamine-formaldehyde resins and polyesters.

In practicing this invention, cotton sheet fibrous material which has been treated until there remains only substantially pure cellulose is impregnated with a suitable liquid resinous varnish in the A-stage to a resin ratio of from 1.65 to 1.75, that is, it comprises from 65 to 75 parts of resin per 100 parts of the purified cotton. The resin impregnated sheet is passed through a drying oven to evaporate off the solvent in the varnish and advance the resin to the B-stage.

A resin preform of desired configuration and size is made from the B-stage impregnated material by processing the material as set forth in Patent 2,504,144, for example, to provide a compacted unitary body. The resin remains in the B-stage during the production of the preform.

Before the preform is molded into a final product, substantially all moisture is removed therefrom. This is accomplished by placing the preform in a dehumidification or desiccation chamber until the moisture is removed, or by drying in an oven at a temperature from 40° C. to 50° C. for a period of time of from 12 to 20 hours. While the preform is in the moisture-free condition, it is placed in a mold, along with a web-forming material and a hub, and subjected to a temperature and pressure sufficient to advance the resin to its final solid, insoluble and infusible C-stage. The molding temperatures and pressures used will of course depend upon the choice of resinous binder. With a phenolic resinous binder, temperatures of from 150 to 175° C. and pressures of from 3000 to 8000 p. s. i. have been used.

Illustrated in the single figure of the drawing is a gear which is exemplary of this invention. The gear wheel 10 comprises a knurled metal bushing 12, having molded thereon a web portion 14 and an outer rim portion 16, the outer rim portion being bonded integrally with the web portion during the molding operation. For reasons of economy, the web portion 14 may be made of any conventional molding material and of any suitable shape or form, such as macerated or laminated fibrous material impregnated with a suitable resinous binder. It is to be understood that in some cases, the web may be of metal. It is necessary, however, that the outer rim portion 16 have high strength properties, particularly at elevated temperatures. This is accomplished by molding the outer rim portion 16 from a laminated preform comprising a helically wound superimposed resinous impregnated rim sheet of purified cotton duck standing on edge and forming laminations 18. The laminations 18 of the outer rim portion 16 are arranged in a plane substantially at right angles to the rotational axis of the gear wheel 10. This is done so that the teeth of the gear will have a suitable correlation between maximum strength and edge grain wear characteristics, which are desirable. It is to be understood that the teeth of the gear are machined in a finished gear blank.

The following example is illustrative of the practice of this invention.

Example

A sheet of 15 ounce purified cotton duck treated as disclosed previously to remove all impurities, was impregnated with a liquid A-stage phenolic varnish to a resin ratio of 1.70. The resin in the impregnated sheet was advanced to the B-stage by drying in a tower. From this B-stage impregnated material there was prepared a helically wound preform of desired size using the process of Patent 2,504,144. Substantially all moisture was removed from this preform by heating in an oven at a temperature of approximately 50° C. for 15 hours. This rim portion preform was positioned in a mold in concentric relation with a web portion preform and a metal bushing. The web portion preform comprised macerated conventional cotton duck impregnated with a phenolic resin. This assembly was subjected to a temperature of 160° C. and a pressure of 4000 p. s. i. for 15 minutes to produce a gear blank. Teeth were machined in the blank to produce a gear such as that illustrated in the drawing.

This gear was tested dynamically by being placed in a gear train which subjected the gear to a steady torque with a superimposed alternating torque while being operated at a temperature of 300° F. Under these conditions, the gear had a mean life expectancy of at least 140 hours at a peak tooth load of 250 pounds applied at the pitch line. This gear was also tested statically by keying it to a locked shaft and measuring the torque required to produce failure by rotating a pinion engaged with the gear. Under these conditions at 300° F., this gear developed a tooth strength of 1400 to 1800 pounds applied at the pitch line at rupture.

Another gear made with the same resin and following the same process was produced except that conventional untreated or "grey" goods cotton duck was used as the filler for the rim portion. This gear had a static tooth strength of only 800 pounds at 300° F. and a short mean life expectancy of 13.5 hours on the same dynamic test apparatus. Such a marked difference in strength and life expectancy between the two gears illustrates the unexpected results obtained when practicing this invention.

It is to be understood that the high strength and high heat resistant resinous laminates embodying purified cellulose fibers can be employed for numerous uses other than for gears. Thus, pulleys, bearings, and other products may be prepared therewith.

Since certain obvious changes may be made in the above procedure and different embodiments of the invention could be made without departing from the spirit and scope thereof, it is intended that the description and drawing be taken as illustrative and not in a limiting sense.

We claim as our invention:

1. A gear comprising a molded outer rim portion of laminated sheet fibrous material bonded together with a thermoset resinous binder selected from the group consisting of phenol-formaldehyde resins, epoxy resins, melamine-formaldehyde resins, and polyester resins, the laminated sheet fibrous material being substantially at right angles to the axis of the gear, the sheet fibrous material being natural cotton fibrous material which has been chemically treated to remove substantially all dirt, starch sizing, natural oils and waxes to leave a fibrous material comprising substantially only pure cellulose, the chemically treated cotton cooperating with said thermoset resinous binder to provide a gear which has greater heat stability than a similar gear prepared from natural cotton composed of unpurified cellulose.

2. A gear comprising a molded outer rim portion of laminated sheet fibrous material bonded together with from 65 to 75 parts by weight of a thermoset phenol-formaldehyde resin for each 100 parts by weight of the sheet fibrous material, the laminated sheet fibrous material being disposed substantially at right angles to the axis of the gear and consisting essentially of natural cotton duck which has been chemically treated to remove substantially all dirt, starch sizing, natural oils, and waxes therefrom, the duck having been reduced in weight by about 15% by the chemical treatment to provide a fibrous material comprising substantially only pure cotton cellulose, the treated cotton duck cooperating with said thermoset resinous binder to provide a gear which has greater heat stability than a similar gear prepared from cotton duck composed of unpurified cellulose.

3. A molded article of manufacture comprising a natural cotton fibrous material bonded together with a thermoset resinous binder selected from the group consisting of phenol-formaldehyde resins, epoxy resins, melamine-formaldehyde resins, and polyester resins, the natural cotton fibrous material having been chemically treated to remove substantially all dirt, starch sizing, natural oils, and waxes to leave a fibrous material comprising substantially only pure cotton cellulose, the chemically treated cotton fibrous material cooperating with said thermoset resinous binder to provide a molded article which has greater heat stability than a similar article prepared from natural cotton composed of unpurified cellulose.

References Cited in the file of this patent

UNITED STATES PATENTS

| Number | Name | Date |
|---|---|---|
| 1,284,296 | Frederick | Nov. 12, 1918 |
| 1,501,026 | Guay | July 8, 1924 |
| 1,912,083 | Lytte | May 30, 1933 |
| 1,999,062 | Sherman | Apr. 23, 1935 |
| 2,000,769 | Mansur | May 7, 1935 |
| 2,092,502 | Ellis | Sept. 7, 1937 |